United States Patent
Murata et al.

(10) Patent No.: US 9,688,918 B2
(45) Date of Patent: Jun. 27, 2017

(54) HYDROCARBON SYNTHESIS REACTION APPARATUS

(71) Applicants: Japan Oil, Gas and Metals National Corporation, Tokyo (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel & Sumikin Engineering Co., Ltd., Tokyo (JP)

(72) Inventors: Atsushi Murata, Tokyo (JP); Eiichi Yamada, Tokyo (JP); Kazuki Murahashi, Tokyo (JP); Yuzuru Kato, Tokyo (JP); Yasuhiro Onishi, Tokyo (JP)

(73) Assignees: Japan Oil, Gas and Metals National Corporation, Tokyo (JP); INPEX CORPORATION, Tokyo (JP); JX Nippon Oil & Energy Corporation, Tokyo (JP); Japan Petroleum Exploration Co., Ltd., Tokyo (JP); COSMO OIL CO., LTD., Tokyo (JP); NIPPON STEEL & SUMIKIN ENGINEERING CO., Tokyo (JP)

( * ) Notice: Subject to any disclaimer, the term of this patent is extended or adjusted under 35 U.S.C. 154(b) by 0 days.

(21) Appl. No.: 14/778,636

(22) PCT Filed: Mar. 19, 2014

(86) PCT No.: PCT/JP2014/057553
§ 371 (c)(1),
(2) Date: Sep. 21, 2015

(87) PCT Pub. No.: WO2014/156890
PCT Pub. Date: Oct. 2, 2014

(65) Prior Publication Data
US 2016/0046870 A1 Feb. 18, 2016

(30) Foreign Application Priority Data
Mar. 26, 2013 (JP) .................... 2013-065192

(51) Int. Cl.
*B01J 19/00* (2006.01)
*B01J 19/24* (2006.01)
(Continued)

(52) U.S. Cl.
CPC ............ *C10G 2/343* (2013.01); *C10G 2/32* (2013.01); *C10G 2/342* (2013.01); *C10G 31/09* (2013.01); *B01J 2219/00006* (2013.01)

(58) Field of Classification Search
CPC ................. B01J 19/00; B01J 19/24; B01J 2219/00–2219/00006; C10G 2/00; (Continued)

(56) References Cited

U.S. PATENT DOCUMENTS

2011/0039952 A1 2/2011 Tasaka
2011/0044859 A1 2/2011 Onishi et al.
(Continued)

FOREIGN PATENT DOCUMENTS

CN 101116803 A 2/2008
CN 102165037 A 8/2011
(Continued)

OTHER PUBLICATIONS

Machine translation of WO 2010/038396A1 provided with IDS filed Sep. 21, 2015 and published Apr. 8, 2010.*
(Continued)

*Primary Examiner* — Natasha Young
(74) *Attorney, Agent, or Firm* — Panitch Schwarze Belisario & Nadel LLP (57) ABSTRACT

The hydrocarbon synthesis reaction apparatus according to the present invention includes a reaction vessel that brings a synthesis gas having carbon monoxide gas and hydrogen gas as main components into contact with a slurry having a solid catalyst suspended in a liquid hydrocarbon compound to synthesize a liquid hydrocarbon compound using a Fischer-Tropsch reaction; a filter that is provided within the reaction vessel and is configured to separate the liquid hydrocarbon compound from the catalyst; and a powdered catalyst particles-discharging device configured to discharge powdered
(Continued)

catalyst particles in the solid catalyst in the slurry to the outside of the reaction vessel.

7 Claims, 2 Drawing Sheets

(51) Int. Cl.
    *C10G 2/00*     (2006.01)
    *C10G 31/00*     (2006.01)
    *C10G 31/09*     (2006.01)

(58) Field of Classification Search
    CPC ... C10G 2/30; C10G 2/32; C10G 2/34; C10G 2/342; C10G 2/343
    See application file for complete search history.

(56) References Cited

U.S. PATENT DOCUMENTS

| | | |
|---|---|---|
| 2012/0178831 A1 | 7/2012 | Tasaka |
| 2013/0171040 A1 | 7/2013 | Ha et al. |
| 2014/0018449 A1 | 1/2014 | Shingu |

FOREIGN PATENT DOCUMENTS

| | | |
|---|---|---|
| CN | 102498191 A | 6/2012 |
| JP | 147649 B | 1/1942 |
| JP | 50-016966 A | 2/1975 |
| JP | 51-143954 A | 12/1976 |
| JP | 2013543018 A | 11/2013 |
| WO | 2009113613 A1 | 9/2009 |
| WO | 2009113614 A1 | 9/2009 |
| WO | WO 2009/113613 A1 * | 9/2009 |
| WO | WO 2009/113614 A1 * | 9/2009 |
| WO | 2010038396 A1 | 4/2010 |
| WO | 2011034036 A1 | 3/2011 |
| WO | 2012036377 A2 | 3/2012 |
| WO | 2012132920 A1 | 10/2012 |

OTHER PUBLICATIONS

Office Action issued May 20, 2016 in CN Application No. 201480017842.6.
Office Action issued Aug. 23, 2016 in JP Application No. 2013-065192.
International Search Report issued Jun. 24, 2014 in International Application No. PCT/JP2014/057553.

* cited by examiner

HYDROCARBON SYNTHESIS REACTION APPARATUS

CROSS-REFERENCE TO RELATED APPLICATION

This application is a Section 371 of International Application No. PCT/JP2014/057553, filed Mar. 19, 2014, which was published in the Japanese language on Oct. 2, 2014, under International Publication No. WO 2014/156890 A1, and claims foreign priority to Japanese Patent Application No. JP 2013-065192, field Mar. 26, 2013, the disclosure of which is incorporated herein by reference.

FIELD OF THE INVENTION

The present invention relates to a hydrocarbon synthesis reaction apparatus.

Priority is claimed on Japanese Patent Application No. 2013-065192, filed Mar. 26, 2013, the content of which is incorporated herein by reference.

BACKGROUND ART OF THE INVENTION

In recent years, as one of the methods for synthesizing liquid fuel from natural gas, the GTL (Gas-to-Liquid: liquid fuel synthesis) technique has been developed. In the GTL technique, natural gas is reformed to produce synthesis gas having carbon monoxide gas (CO) and hydrogen gas ($H_2$) as main components, hydrocarbons are synthesized using a catalyst by the Fischer-Tropsch synthesis reaction (hereinafter, referred to as "FT synthesis reaction") with the synthesis gas as a feedstock gas, and the hydrocarbons are hydrogenated and refined to produce liquid fuel products, such as naphtha (raw gasoline), kerosene, gas oil, and wax.

In hydrocarbon synthesis reaction apparatuses used for this GTL technique, hydrocarbons are synthesized by performing the FT synthesis reaction on the carbon monoxide gas and the hydrogen gas in the synthesis gas inside a reaction vessel in which a slurry having solid catalyst particles (for example, a cobalt catalyst or the like) suspended in a medium liquid (for example, a liquid hydrocarbon compound or the like) is held.

In this type of hydrocarbon synthesis reaction apparatus, in order to deliver the liquid hydrocarbon compound produced by the FT synthesis reaction to the outside of the reaction vessel, the liquid hydrocarbon compound and catalyst particles are separated by a filter installed in the reaction vessel, and the separated liquid hydrocarbon compound is delivered to the outside of the reaction vessel (for example, refer to the following PTL 1).

PRIOR ART DOCUMENT

Patent Document

Patent Document 1: Republished Japanese Translation No. 2010-038396 of the PCT International Publication for Patent Applications

SUMMARY OF INVENTION

Technical Problem

In this type of hydrocarbon synthesis reaction apparatus, the synthesis gas is supplied into the reaction vessel, and the slurry is made to react with the synthesis gas within the reaction vessel while being agitated. Although it is important to disperse the catalyst particles as uniformly as possible within the reaction vessel, the flow rate of the synthesis gas to be supplied to the inside of the reaction vessel is limited. Thus, if the particle diameter of the catalyst particles is too large, the settling velocity of the catalyst particles is excessively increased, and a reaction with the synthesis gas may not be reliably performed. The particle diameter of the catalyst particles should not be excessively small from the viewpoint of recovering the synthesized liquid hydrocarbon compound separately from the catalyst particles. As a result, for example, in the case of a specific gravity difference between ordinary liquid and a solid, the diameter of the catalyst particles is constrained to a constant range of 100 microns.

Such catalyst particles are dispersed by the agitation flow of the slurry, and breakage or powdering thereof occurs to some degree with time due to wear or collision with an instrument or other particles. As a result, fine catalyst particles that fall below the range of the initial diameter of catalyst particles are generated.

When the number of fine catalyst particles within the reaction vessel increases markedly due to a prolonged operation, there is a concern that a cake layer formed on a filtering surface of a filter on an upstream side may become too dense, a filtering differential pressure (a differential pressure between the upstream side and downstream side of the filter) may be increased, and recovery of the liquid hydrocarbon compound corresponding to the amount of reaction production may be difficult.

Moreover, if the relationship between the diameter of the fine catalyst particles and the aperture of filter meshes satisfies certain conditions, the filter may become clogged or regeneration by backwashing may be difficult. The filter installed within the reaction vessel cannot be subjected to such maintenance in which, during operation, the filter is detached and clogging matter, such as catalyst particles, is washed away and removed. If the filtering differential pressure exceeds numerical values in design or the filter causes clogging, continuation of operation may be difficult.

Moreover, the powdered catalyst particles may lower settling velocity, may be entrained in a stream of off-gas that flows out from a reaction vessel outlet, and may scatter and flow out to a top gas system.

Additionally, generally, a solid catalyst has reduced metal as an active element, and if the active element oxidizes and turns into an oxide due to the presence of oxygen or water, such as a reaction product, weight is increased and activity is lost. Moreover, the particles may be bonded together to be agglomerated in an oxidization process.

Such oxidized and agglomerated catalyst settles easily as the particle weight or particle diameter increases. If such particles are accumulated in the reaction vessel, a poor flow caused by uneven dispersion of the catalyst may occur because the heavier particles, the more likely they are to settle in the reaction vessel.

The productivity of the liquid hydrocarbon compound may decline due to a decrease in the amount of catalyst within the reaction vessel or degradation of catalytic activity, which are caused by the aforementioned problems.

The invention has been made in view of the aforementioned situation, and an object thereof is to provide a hydrocarbon synthesis reaction apparatus that can prevent a filter inside a reaction vessel from being clogged by adhesion of powdered fine catalyst particles, and can thereby stably deliver a liquid hydrocarbon compound to the outside of the reaction vessel. Moreover, another object of the invention is to provide a hydrocarbon synthesis reaction apparatus that can prevent agglomerated catalyst particles that settle easily in a slurry from being condensed within the reaction vessel, and can suppress decrease in the flowability of a slurry due to uneven dispersion of a catalyst.

Solution to Problem

A hydrocarbon synthesis reaction apparatus of the invention includes: a reaction vessel configured to bring a synthesis gas having carbon monoxide gas and hydrogen gas as main components into contact with a slurry having a solid catalyst suspended in a liquid hydrocarbon compound to synthesize a liquid hydrocarbon compound using a Fischer-Tropsch reaction; a filter that installed inside the reaction vessel and is configured to separate the liquid hydrocarbon compound from the catalyst; and a powdered catalyst particles-discharging device configured to discharge powdered catalyst particles in the solid catalyst in the slurry to the outside of the reaction vessel.

According to the aforementioned hydrocarbon synthesis reaction apparatus, the powdered fine catalyst particles in the solid catalyst in the slurry are continuously or periodically discharged to the outside of the reaction vessel by the powdered catalyst particles discharging device. For this reason, even in a case where the powdering of the catalyst proceeds more than expected or a prolonged operation is performed, the amount of fine catalyst particles present within the reaction vessel does not markedly increase. This can prevent the filter from being clogged by the fine catalyst particles. As a result, the liquid hydrocarbon compound synthesized within the reaction vessel can be separated from the catalyst by the filter, and can be stably delivered to the outside of the reaction vessel.

Additionally, since the powdered fine catalyst particles are positively discharged to the outside of the reaction vessel, the number of catalyst particles entrained in the unreacted gas discharged from the top of the reaction vessel can also be decreased. For this reason, the number of the catalyst particles included in the light oil (gas oil) is also decreased, mixing of an element, which causes catalyst poisoning in a process that hydrocracks the light oil in a subsequent stage of a light oil processing system, decreases, and the yield rate of a product improves as a result.

In the hydrocarbon synthesis reaction apparatus of the invention, the powdered catalyst particles-discharging device may include a first classifier configured to separate the powdered catalyst particles from the solid catalyst in the slurry, using a settling velocity difference of the particles in a liquid; an outflow passage configured that the powdered catalyst particles separated in the first classifier flows to the outside of the first classifier together with the liquid hydrocarbon compound therethrough; and a powdered catalyst particles separator that is provided in the outflow passage and is configured to trap the powdered catalyst particles.

The powdered catalyst particles are separated from the solid catalyst in the slurry by the first classifier. That is, relatively heavy catalyst particles gather at a lower portion of the first classifier, and relatively light catalyst particles, such as the powdered catalyst particles, gather at an upper portion of the first classifier. The fine catalyst particles that have gathered at the upper portion of the first classifier flow out from the upper portion of the first classifier through the outflow passage into the outside of the first classifier together with the liquid hydrocarbon compound. The fine catalyst particles that have flowed out to the outside of the first classifier are trapped by the powdered catalyst particles separator.

This enables the powdered fine catalyst particles to be continuously or periodically trapped. In addition, the liquid hydrocarbon compound from which the fine catalyst particles are separated may be returned to and reused for the reaction vessel, or may be used as a liquid to filter backwashing within the reaction vessel.

The hydrocarbon synthesis reaction apparatus of the invention may further include an outflow velocity adjuster configured to adjust the outflow velocity of the liquid hydrocarbon compound, including the powdered catalyst particles, in the outflow passage, an upper portion of the first classifier may be formed in the shape of a cone, and a plurality of slurry extraction nozzles arrayed in a height direction of the first classifier may be provided inside the first classifier.

By arranging the plurality of slurry extraction nozzles with height differences inside the first classifier that is formed in the shape of a cone and by adjusting the outflow velocity of the liquid hydrocarbon compound including the powdered catalyst particles, the particle diameter of the fine catalyst particles separated by the first classifier, and the flow rate of the recovered liquid hydrocarbon compound can be adjusted in a wide range. That is, if the slurry is extracted from an extraction nozzle that is located below, the outflow velocity of the liquid hydrocarbon compound including the catalyst particles is accelerated, and the catalyst particles with a relatively large particle diameter flow out from the first classifier through the outflow passage to the outside. On the other hand, if the slurry is extracted from an extraction nozzle that is located above, the outflow velocity of the liquid hydrocarbon compound including the catalyst particles is slowed, and the catalyst particles with a relatively small particle diameter flow out from the first classifier through the outflow passage to the outside.

In the hydrocarbon synthesis reaction apparatus of the invention, any one system of a filtering system, a gravitational settling system, a cyclone system, a centrifugal separation system, and a magnetic separation system may be adopted in the powdered catalyst particles separator.

The hydrocarbon synthesis reaction apparatus of the invention may further include an agglomerated catalyst particles discharging device configured to discharge agglomerated catalyst particles in the solid catalysts in the slurry to the outside of the reaction vessel.

The deactivated catalyst that is agglomerated and increased in weight is periodically discharged to the outside of the reaction vessel by the agglomerated catalyst particles discharging device. For this reason, the agglomerated deactivated catalyst that settles easily in the slurry can be prevented from being condensed within the reaction vessel. As a result, it is possible to suppress a situation where the catalyst is unevenly dispersed and thereby the flowability of the slurry decreases.

In the hydrocarbon synthesis reaction apparatus of the invention, the agglomerated catalyst particles discharging device may be include a second classifier configured to separate the agglomerated catalyst particles from the solid catalyst in the slurry, using a settling velocity difference of the particles in a liquid; and a discharging passage configured that the agglomerated catalyst particles separated in the second classifier are discharged to the outside of the second classifier therethrough.

The agglomerated catalyst particles are separated from the solid catalyst in the slurry by the second classifier. That is, the relatively heavy agglomerated catalyst particles gather at a lower portion of the second classifier. The agglomerated catalyst particles that have gathered at the lower portion of the second classifier flow out to the outside of the second classifier through the discharging passage. This enables the agglomerated catalyst particles to be continuously or periodically trapped.

The hydrocarbon synthesis reaction apparatus of the invention may further include a supply rate adjustor configured to adjust the supply rate of the liquid hydrocarbon compound in a connecting line that supplies the liquid hydrocarbon compound to the second classifier, an upper portion of the second classifier may be formed in the shape of a cone, and the liquid hydrocarbon compound supplied to the second classifier may be blown out upward inside the second classifier.

By adjusting the supply rate of the liquid hydrocarbon compound supplied to the second classifier that is formed in the shape of a cone, the easiness of floating of the catalyst particles inside the second classifier can be changed. That is, if the supply rate of the liquid hydrocarbon compound is decreased, the catalyst particles with a relatively small particle diameter are separated and recovered from the liquid hydrocarbon compound. If the supply rate of the liquid hydrocarbon compound is increased, the catalyst particles with a relatively large particle diameter also float easily inside the second classifier. Thus, the agglomerated catalyst particles are separated and recovered from the liquid hydrocarbon compound.

In the hydrocarbon synthesis reaction apparatus of the invention, the reaction vessel may be further provided with a catalyst particles feed device configured to feed new catalyst particles to the slurry in the reaction vessel.

In order to compensate for a shortage of the deactivated catalyst discharged to the outside of the reaction vessel by the powdered catalyst particles-discharging device and the agglomerated catalyst particles discharging device, a decrease in the production amount of the liquid hydrocarbon compound accompanied with a decrease in the number of catalyst particles or degradation of catalytic activity can be suppressed by adding new catalyst particles to the reaction vessel.

Advantageous Effects of the Invention

According to the invention, the filter inside the reaction vessel can be prevented from being clogged by adhesion thereto of the powdered fine catalyst particles, and thereby, the liquid hydrocarbon compound can be stably delivered to the outside of the reaction vessel.

Additionally, the agglomerated catalyst particles that settle easily in the slurry can be prevented from being condensed within the reaction vessel, and it is possible to suppress decrease in the flowability of the slurry due to uneven dispersion of the catalyst.

DETAILED DESCRIPTION OF THE INVENTION

Hereinafter, an embodiment of a hydrocarbon synthesis reaction system including a hydrocarbon synthesis reaction apparatus of the invention will be described, referring to the drawings.

(Liquid Fuel Synthesizing System)

Figure 1:
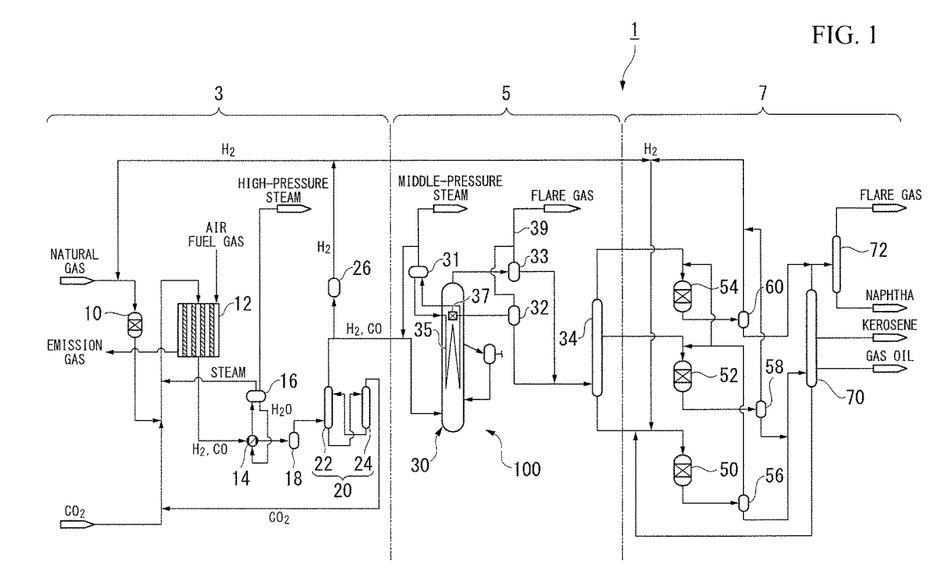
FIG. 1 is a system diagram showing an overall configuration of a liquid fuel synthesizing system including an embodiment of a hydrocarbon synthesis reaction apparatus related to the invention.

FIG. 1 is a system diagram showing an overall configuration of the liquid fuel synthesizing system that carries out an embodiment of a start-up method of the hydrocarbon synthesis reaction apparatus of the invention. As shown in FIG. 1, a liquid fuel synthesizing system (hydrocarbon synthesis reaction system) 1 is a plant facility that executes the GTL process that converts a hydrocarbon feedstock, such as natural gas, into liquid fuel. The liquid fuel synthesizing system 1 includes a synthesis gas production unit 3, an FT synthesis unit (hydrocarbon synthesis reaction apparatus) 5, and an upgrading unit 7. The synthesis gas production unit 3 reforms natural gas, which is a hydrocarbon feedstock, to produce synthesis gas including carbon monoxide gas and hydrogen gas. The FT synthesis unit 5 produces a liquid hydrocarbon compound by the FT synthesis reaction from the produced synthesis gas. The upgrading unit 7 hydrogenates and refines the liquid hydrocarbon compound synthesized by the FT synthesis reaction to produce liquid fuel and other products (naphtha, kerosene, gas oil, wax, or the like). Hereinafter, constituent elements of these respective units will be described.

First, the synthesis gas production unit 3 will be described.

The synthesis gas production unit 3 includes, for example, a desulfurization reactor 10, a reformer 12, a waste heat boiler 14, vapor-liquid separators 16 and 18, a $CO_2$ removal unit 20, and a hydrogen separator 26. The desulfurization reactor 10 is constituted by a hydrodesulfurizer or the like, and removes a sulfur component from natural gas as a feedstock. The reformer 12 reforms the natural gas supplied from the desulfurization reactor 10 to produce synthesis gas including carbon monoxide gas (CO) and hydrogen gas ($H_2$) as main components. The waste heat boiler 14 recovers waste heat of the synthesis gas produced by the reformer 12 to generate high-pressure steam. The vapor-liquid separator 16 separates the water heated by heat exchange with the synthesis gas in the waste heat boiler 14 into gas (high-pressure steam) and liquid. The vapor-liquid separator 18 removes a condensed component from the synthesis gas cooled in the waste heat boiler 14, and supplies a gas component to the $CO_2$ removal unit 20.

The $CO_2$ removal unit 20 has an absorption tower 22 and a regeneration tower 24. In the absorption tower 22, carbon dioxide gas included in the synthesis gas supplied from the vapor-liquid separator 18 is absorbed by an absorbent. In the regeneration tower 24, the absorbent that has absorbed the carbon dioxide gas strips the carbon dioxide gas, and the absorbent is regenerated. The hydrogen separator 26 separates a portion of the hydrogen gas included in the synthesis gas therefrom, the synthesis gas from which the carbon dioxide gas has been separated by the $CO_2$ removal unit 20. It is to be noted herein that the $CO_2$ removal unit 20 may not be provided depending on the circumstances.

In the reformer 12, the natural gas is reformed by the carbon dioxide gas and steam, for example, using a steam and carbon-dioxide-gas reforming method expressed by the following chemical reaction formulas (1) and (2), to produce high-temperature synthesis gas having carbon monoxide gas and hydrogen gas as main components. In addition, the reforming method in the reformer 12 is not limited to the steam and carbon-dioxide-gas reforming method. For example, a steam reforming method, a partial oxidation reforming method (POX) using oxygen, an auto-thermal reforming method (ATR) as a combination of the partial oxidation reforming method and the steam reforming method, a carbon-dioxide-gas reforming method, and the like can also be utilized.

$$CH_4 + H_2O \rightarrow CO + 3H_2 \qquad (1)$$

$$CH_4 + CO_2 \rightarrow 2CO + 2H_2 \qquad (2)$$

The hydrogen separator 26 is provided on a branch line branching from a main line that connects the CO$_2$ removal unit 20 or the vapor-liquid separator 18 with a bubble column reactor 30. The hydrogen separator 26 can be constituted by, for example, a hydrogen pressure swing adsorption (PSA) device that performs adsorption and desorption of hydrogen by using a pressure difference. This hydrogen PSA device has an adsorbent (a zeolitic adsorbent, activated carbon, alumina, silica gel, or the like) in a plurality of adsorption towers (not shown) that are arranged in parallel. High-purity hydrogen gas (for example, about 99.999%) separated from the synthesis gas can be continuously supplied by repeating respective processes of the pressurization, adsorption, desorption (depressurization), and purge of hydrogen in order in the respective adsorption towers.

The hydrogen gas-separating method in the hydrogen separator 26 is not limited to the pressure swing adsorption method using the hydrogen PSA device. For example, a hydrogen storing alloy adsorption method, a membrane separation method, or a combination thereof may be used.

The hydrogen storing alloy method is, for example, a technique of separating hydrogen gas, using a hydrogen storing alloy (TiFe, LaNi$_5$, TiFe$_{0.7\ to\ -0.9}$, Mn$_{0.3\ to\ 0.1}$, TiMn$_{1.5}$, or the like) having the property of adsorbing/releasing hydrogen by being cooled/heated. In the hydrogen storing alloy method, adsorption of hydrogen by cooling of the hydrogen storing alloy and release of hydrogen by heating of the hydrogen storing alloy are alternately repeated, for example, in the plurality of adsorption towers in which the hydrogen storing alloy is held. This enables the hydrogen gas in the synthesis gas to be separated and recovered.

The membrane separation method is a technique of separating hydrogen gas having excellent membrane permeability from mixed gas, using a membrane made of a polymeric material, such as aromatic polyimide. Since this membrane separation method does not require a phase change of an object to be separated, energy required for operation is small, and running costs are low. Additionally, since the structure of the membrane separation device is simple and compact, facility costs are low, and the required size of facilities is small. Moreover, since a separation membrane has no drive unit and the stable operation range is wide, there is an advantage that maintenance is easy.

Next, the FT synthesis unit 5 will be described.

The FT synthesis unit 5 includes, for example, a bubble column reactor (reaction vessel) 30, a vapor-liquid separator 31, a vapor-liquid separator 32, a vapor-liquid separator 33, and a first fractionator 34. The bubble column reactor 30 synthesizes a liquid hydrocarbon compound by the FT synthesis reaction from the synthesis gas, that is, the carbon monoxide gas and the hydrogen gas, which are produced in the synthesis gas production unit 3.

The vapor-liquid separator 31 separates the water passed and heated through the cooling line 35 disposed within the bubble column reactor 30 into steam (middle-pressure steam) and liquid. The vapor-liquid separator 32 is connected to a primary filter 37 within the bubble column reactor 30, and separates a gas component contained in the liquid hydrocarbon compound passed through the primary filter 37. The vapor-liquid separator 33 is connected to the top of the bubble column reactor 30, and cools unreacted synthesis gas and a gaseous hydrocarbon compound so as to be separated into a liquid hydrocarbon compound and gas including the unreacted synthesis gas. Since components such as methane, which is unnecessary within a system, are included in this gas, some of the components are exhausted from an off-gas exhaust passage 39 to the outside of the system as off-gas. The first fractionator 34 fractionally distills the liquid hydrocarbon compound supplied via the vapor-liquid separator 32 from the bubble column reactor 30 into respective fractions.

Among them, the bubble column reactor 30 is an example of a reaction vessel that synthesizes a liquid hydrocarbon compound from the synthesis gas, and functions as an FT synthesis reaction vessel that synthesizes the liquid hydrocarbon compound from the synthesis gas by the FT synthesis reaction. The bubble column reactor 30 is constituted by, for example, a bubble column slurry bed reactor in which a slurry mainly including catalyst particles and medium oil (medium liquid or liquid hydrocarbons) is held inside a column-shaped vessel. The bubble column reactor 30 synthesizes a gaseous or liquid hydrocarbon compound from the synthesis gas by the FT synthesis reaction. In detail, in the bubble column reactor 30, the synthesis gas as a feedstock gas is supplied as bubbles from a sparger at the bottom of the bubble column reactor 30, and passes through the slurry having the catalyst particles suspended in the medium oil. Also, as shown in the following reaction formula (3) in a suspended state, the hydrogen gas and the carbon monoxide gas included in the synthesis gas react with each other, and a hydrocarbon compound is synthesized.

$$2nH_2 + nCO \rightarrow (-CH_2-)_n + nH_2O \qquad (3)$$

Here, in such a reaction, the ratio of the carbon monoxide gas consumed within the reactor to the carbon monoxide gas (CO) supplied to the FT synthesis unit 5 is referred to as a "CO conversion rate" in the present application. This CO conversion rate is calculated in terms of percentage from the molar flow rate (synthesis gas-to-CO molar flow rate) of carbon monoxide gas in gas that flows into the FT synthesis unit 5 per unit time, and the molar flow rate (off gas-to-CO molar flow rate) of carbon monoxide gas in off-gas extracted per unit time from an off-gas exhaust passage 39 from the FT synthesis unit 5. That is, the CO conversion rate is obtained by the following formula (4).

$$\text{CO conversion rate} = \frac{(\text{synthesis gas-to-CO molar flow rate}) - (\text{off gas-to-CO molar flow rate})}{\text{synthesis gas-to-CO molar flow rate}} \times 100 \qquad (4)$$

Since this FT synthesis reaction is an exothermic reaction, the bubble column reactor 30 is a heat exchanger type in which the cooling line 35 is disposed inside the reactor. Water (BFW: Boiler Feed Water) or the like is supplied as a refrigerant to the bubble column reactor 30, and the reaction heat of the FT synthesis reaction can be recovered as middle-pressure steam by the heat exchange between the slurry and water.

Next, the upgrading unit 7 will be described. The upgrading unit 7 includes, for example, a wax fraction-hydrocracking reactor 50, a middle distillate-hydrotreating reactor 52, a naphtha fraction-hydrotreating reactor 54, vapor-liquid separators 56, 58, and 60, a second fractionator 70, and a naphtha stabilizer 72. The wax fraction-hydrocracking reactor 50 is connected to the bottom of the first fractionator 34.

The middle distillate-hydrotreating reactor 52 is connected to a middle portion of the first fractionator 34. The naphtha fraction-hydrotreating reactor 54 is connected to the top of the first fractionator 34. The vapor-liquid separators 56, 58, and 60 are provided corresponding to the hydrogenating reactors 50, 52, and 54, respectively. The second fractionator 70 fractionally distills the liquid hydrocarbon compound supplied from the vapor-liquid separators 56 and 58. The naphtha stabilizer 72 rectifies a liquid hydrocarbon compound of a naphtha fraction that is supplied from the vapor-liquid separator 60 and is fractionally distilled from the second fractionator 70. As a result, the naphtha stabilizer 72 discharges butane and a component lighter than butane as off-gas, and recovers a component having a carbon number of five or more as a naphtha product.

Next, a process (GTL process) in a rated operation that synthesizes liquid fuel from the natural gas by the liquid fuel synthesizing system 1 configured as above will be described.

Natural gas (the main component of which is $CH_4$) as a hydrocarbon feedstock is supplied to the liquid fuel synthesizing system 1 from an external natural gas supply source (not shown), such as a natural gas field or a natural gas plant. The synthesis gas production unit 3 reforms this natural gas to produce synthesis gas (mixed gas having carbon monoxide gas and hydrogen gas as main components).

Specifically, first, the natural gas is introduced into the desulfurization reactor 10 together with the hydrogen gas separated by the hydrogen separator 26. In the desulfurization reactor 10, a sulfur component included in the natural gas is converted into hydrogen sulfide by the introduced hydrogen gas and a hydrodesulfurizing catalyst. Moreover, in the desulfurization reactor 10, the produced hydrogen sulfide is adsorbed and removed by a desulfurizing agent, such as ZnO. By desulfurizing the natural gas in advance in this way, it is possible to prevent the activity of catalysts used in the reformer 12, the bubble column reactor 30, and the like from decreasing due to sulfur.

The natural gas (may also include carbon dioxide gas) desulfurized in this way is supplied to the reformer 12 after the carbon dioxide ($CO_2$) gas supplied from a carbon-dioxide gas supply source (not shown) and the steam generated in the waste heat boiler 14 are mixed with each other. In the reformer 12, the natural gas is reformed by the carbon dioxide gas and steam, for example, using the aforementioned steam and carbon-dioxide-gas reforming method, to produce the high-temperature synthesis gas having carbon monoxide gas and hydrogen gas as main components. At this time, for example, fuel gas and air for a burner provided in the reformer 12 are supplied to the reformer 12. Then, reaction heat required for the aforementioned steam and carbon-dioxide-gas reforming reaction that is an endothermic reaction is provided by the heat of combustion of the fuel gas in the burner.

The high-temperature synthesis gas (for example, 900° C., 2.0 MPaG) produced in the reformer 12 in this way is supplied to the waste heat boiler 14, and is cooled (for example, 400° C.) by the heat exchange with water that passes through the waste heat boiler 14. Then, the waste heat of the synthesis gas is recovered by water.

At this time, the water heated by the synthesis gas in the waste heat boiler 14 is supplied to the vapor-liquid separator 16. Then, the water heated by this synthesis gas is separated into high-pressure steam (for example, 3.4 to 10.0 MPaG) and water in the vapor-liquid separator 16. The separated high-pressure steam is supplied to the reformer 12 or other external devices, and the separated water is returned to the waste heat boiler 14.

On the other hand, the synthesis gas cooled in the waste heat boiler 14 is supplied to the absorption tower 22 of the $CO_2$ removal unit 20, or the bubble column reactor 30, after a condensed liquid component is separated and removed in the vapor-liquid separator 18. In the absorption tower 22, the carbon dioxide gas included in the synthesis gas is absorbed by the absorbent stored inside the absorption tower 22, and the carbon dioxide gas is removed from the synthesis gas. The absorbent that has absorbed the carbon dioxide gas within the absorption tower 22 is discharged from the absorption tower 22, and is introduced into the regeneration tower 24. The absorbent introduced into the regeneration tower 24 is heated and subjected to stripping processing with, for example, steam, and strips the carbon dioxide gas. The stripped carbon dioxide gas is discharged from the regeneration tower 24, is introduced into the reformer 12, and is reused for the reforming reaction.

The synthesis gas produced in the synthesis gas production unit 3 in this way is supplied to the bubble column reactor 30 of the aforementioned FT synthesis unit 5. At this time, the composition ratio of the synthesis gas supplied to the bubble column reactor 30 is adjusted to a composition ratio (for example, $H_2:CO=2:1$ (molar ratio)) suitable for the FT synthesis reaction. In addition, the synthesis gas supplied to the bubble column reactor 30 is boosted to a pressure (for example, about 3.6 MPaG) suitable for the FT synthesis reaction by a first compressor (not shown) provided at the line that connects the $CO_2$ removal unit 20 and the bubble column reactor 30.

Additionally, a portion of the synthesis gas, from which the carbon dioxide gas has been separated by the aforementioned $CO_2$ removal unit 20, is also supplied to the hydrogen separator 26. In the hydrogen separator 26, the hydrogen gas included in the synthesis gas is separated by adsorption and desorption (hydrogen PSA) utilizing a pressure difference as mentioned above. The separated hydrogen is continuously supplied from a gas holder (not shown) or the like via a compressor (not shown) to various hydrogen-utilizing reaction units (for example, the desulfurization reactor 10, the wax fraction-hydrocracking reactor 50, the middle distillate-hydrotreating reactor 52, the naphtha fraction-hydrotreating reactor 54, and the like) that perform predetermined reactions, utilizing the hydrogen within the liquid fuel synthesizing system 1.

Next, the aforementioned FT synthesis unit 5 synthesizes a liquid hydrocarbon compound by the FT synthesis reaction from the synthesis gas produced by the aforementioned synthesis gas production unit 3.

Specifically, the synthesis gas, from which the carbon dioxide gas has been separated in the aforementioned $CO_2$ removal unit 20, is introduced into the bubble column reactor 30, and passes through the slurry including the catalyst held within the bubble column reactor 30. At this time, within the bubble column reactor 30, the carbon monoxide gas and hydrogen gas that are included in the synthesis gas react with each other by the aforementioned FT synthesis reaction to produce a hydrocarbon compound.

Moreover, during this FT synthesis reaction, the reaction heat of the FT synthesis reaction is recovered by the water passing through the cooling line 35 of the bubble column reactor 30, and the water heated by the reaction heat evaporates and turns into steam. This steam is supplied to the vapor-liquid separator 31 and is separated into condensed water and a gas component, the water is returned to the cooling line 35 and the gas component is supplied to an external device as middle-pressure steam (for example, 1.0 to 2.5 MPaG).

In this way, the liquid hydrocarbon compound synthesized in the bubble column reactor 30 is discharged in a state where the primary filter 37 has removed catalyst particles from the middle portion of the bubble column reactor 30, and is introduced into the vapor-liquid separator 32. In the vapor-liquid separator 32, a gas component is separated from the introduced liquid hydrocarbon compound. The separated liquid hydrocarbon compound is introduced into the first fractionator 34.

A gaseous by-product including the synthesis gas, which has not reacted in the FT synthesis reaction, and the gaseous hydrocarbon compound generated by the FT synthesis reaction is discharged from the top of the bubble column reactor 30. The gaseous by-product discharged from the bubble column reactor 30 is introduced into the vapor-liquid separator 33. In the vapor-liquid separator 33, the introduced gaseous by-product is cooled and separated into a condensed liquid hydrocarbon compound and a gas component. The separated liquid hydrocarbon compound is discharged from the vapor-liquid separator 33 and is introduced into the first fractionator 34.

The separated gas component is discharged from the vapor-liquid separator 33, and a portion thereof is re-introduced into the bubble column reactor 30. In the bubble column reactor 30, the unreacted synthesis gas (CO and $H_2$) included in the re-introduced gas component is reused for the FT synthesis reaction. Additionally, a portion of the gas component discharged from the vapor-liquid separator 33 is discharged from the off-gas exhaust passage 39 to the outside as off-gas and is used for fuel, or fuel equivalent to liquefied petroleum gas (LPG) is recovered from the gas component.

In the first fractionator 34, the liquid hydrocarbon compound (the carbon number is various) supplied via the vapor-liquid separator 32 from the bubble column reactor 30 as mentioned above is fractionally distilled into a naphtha fraction (the boiling point of which is lower than about 150° C.), a middle distillate (the boiling point of which is about 150° C. to 360° C.) and a wax fraction (the boiling point of which is higher than about 360° C.). A liquid hydrocarbon compound (mainly $C_{22}$ or more) of the wax fraction discharged from the bottom of the first fractionator 34 is introduced into the wax fraction-hydrocracking reactor 50. A liquid hydrocarbon compound (mainly $C_{11}$ to $C_{21}$) of the middle distillate equivalent to kerosene or gas oil discharged from the middle portion of the first fractionator 34 is introduced into the middle distillate-hydrotreating reactor 52. A liquid hydrocarbon compound (mainly $C_5$ to $C_{10}$) of the naphtha fraction discharged from the top of the first fractionator 34 is introduced into the naphtha fraction-hydrotreating reactor 54.

The wax fraction-hydrocracking reactor 50 hydrocracks the liquid hydrocarbon compound (approximately $C_{22}$ or more) of the wax fraction with a large carbon number, which are discharged from the bottom of the first fractionator 34, using the hydrogen gas supplied from the aforementioned hydrogen separator 26, to decrease the carbon number thereof to 21 or less. In this hydrocracking reaction, C—C bonds of the hydrocarbon compound with a large carbon number are cleaved. Accordingly, the hydrocarbon compound with a large carbon number is converted into a hydrocarbon compound with a small carbon number. Additionally, in the wax fraction-hydrocracking reactor 50, a reaction, which hydroisomerizes a straight-chain saturated hydrocarbon compound (normal paraffin) to produce a branched saturated hydrocarbon compound (isoparaffin), also proceeds in parallel to the hydrocracking reaction. This improves the low-temperature flowability of a wax fraction hydrocracking product required as a fuel-oil base material. Moreover, in the wax fraction-hydrocracking reactor 50, a hydrodeoxygenation reaction of an oxygenated compound, such as an alcohol, and a hydrogenation reaction of olefin, which are included in the wax fraction as a feedstock, also proceed. A product including the liquid hydrocarbon compound, which is hydrocracked and discharged from the wax fraction-hydrocracking reactor 50, is introduced into the vapor-liquid separator 56 and is separated into gas and liquid. The separated liquid hydrocarbon compound is introduced into the second fractionator 70, and the separated gas component (including the hydrogen gas) is introduced into the middle distillate-hydrotreating reactor 52 and the naphtha fraction-hydrotreating reactor 54.

In the middle distillate-hydrotreating reactor 52, the liquid hydrocarbon compound (approximately $C_{11}$ to $C_{21}$) of the middle distillate, which is discharged from the middle portion of the first fractionator 34 and is equivalent to kerosene or gas oil with an approximately middle carbon number, is hydrotreated. In the middle distillate-hydrotreating reactor 52, the hydrogen gas supplied via the wax fraction-hydrocracking reactor 50 from the hydrogen separator 26 is used for the hydrotreating. In this hydrotreating reaction, the olefin included in the aforementioned liquid hydrocarbon compound is hydrogenated to produce a saturated hydrocarbon compound, and the oxygenated compound, such as the alcohol included in the aforementioned liquid hydrocarbon compound, is hydrodeoxidated and converted into a saturated hydrocarbon compound and water. Moreover, in this hydrotreating reaction, a hydroisomerization reaction, which isomerizes the straight-chain saturated hydrocarbon compound (normal paraffin) so as to be converted into the branched saturated hydrocarbon compound (isoparaffin), proceeds, and the low-temperature flowability of the produced oil required as fuel oil is improved. A product including the hydrotreated liquid hydrocarbon compound is separated into gas and liquid in the vapor-liquid separator 58.

The separated liquid hydrocarbon compound is introduced into the second fractionator 70, and the gas component (including the hydrogen gas) is reused for the aforementioned hydrogenation reaction.

In the naphtha fraction-hydrotreating reactor 54, the liquid hydrocarbon compound (approximately $C_{10}$ or less) of the naphtha fraction with a small carbon number, which is discharged from the upper portion of the first fractionator 34, is hydrotreated. In the naphtha fraction-hydrotreating reactor 54, the hydrogen gas supplied via the wax fraction-hydrocracking reactor 50 from the hydrogen separator 26 is used for the hydrotreating. In this hydrotreating reaction of the naphtha fraction, hydrogenation of the olefin and hydrodeoxygenation of the oxygenated compound, such as alcohol, mainly proceeds. A product including the hydrotreated liquid hydrocarbon compound is separated into gas and liquid in the vapor-liquid separator 60. The separated liquid hydrocarbon compound is introduced into the naphtha stabilizer 72, and the separated gas component (including the hydrogen gas) is reused for the aforementioned hydrogenation reaction.

In the second fractionator 70, the liquid hydrocarbon compounds supplied as mentioned above from the wax fraction-hydrocracking reactor 50 and the middle distillate-hydrotreating reactor 52 are fractionally distilled into a hydrocarbon compound of $C_{10}$ or less (the boiling point of which is lower than about 150° C.), kerosene (the boiling point of which is about 150° C. to 250° C.), gas oil (the boiling point of which is about 250° C. to 360° C.), and a undecomposed wax component (the boiling point of which is higher than about 360° C.) from the wax fraction-hydrocracking reactor 50. The undecomposed wax fraction is obtained from the bottom of the second fractionator 70, and this wax fraction is recycled to the upstream of the wax fraction-hydrocracking reactor 50. The kerosene and the gas oil are discharged from a middle portion of the second fractionator 70. On the other hand, the hydrocarbon compound of $C_{10}$ or less is discharged from the top of the second fractionator 70 and is introduced into the naphtha stabilizer 72.

Moreover, in the naphtha stabilizer 72, the hydrocarbon compound of $C_{10}$ or less, which is supplied from the aforementioned naphtha fraction-hydrotreating reactor 54 and is fractionally distilled in the second fractionator 70, is distilled, and naphtha ($C_5$ to $C_{10}$) as a product is obtained. Accordingly, high-purity naphtha is discharged from the bottom of the naphtha stabilizer 72. On the other hand, off-gas other than the target products, which has a hydrocarbon compound with a carbon number equal to or less than a predetermined number ($C_4$ or less) as a main component, is discharged from the top of the naphtha stabilizer 72. This off-gas is used as fuel gas, or fuel equivalent to LPG is recovered from this off-gas.

Next, the configuration of main portions of the FT synthesis unit 5 will be described, with reference to FIG. 2.

Figure 2:
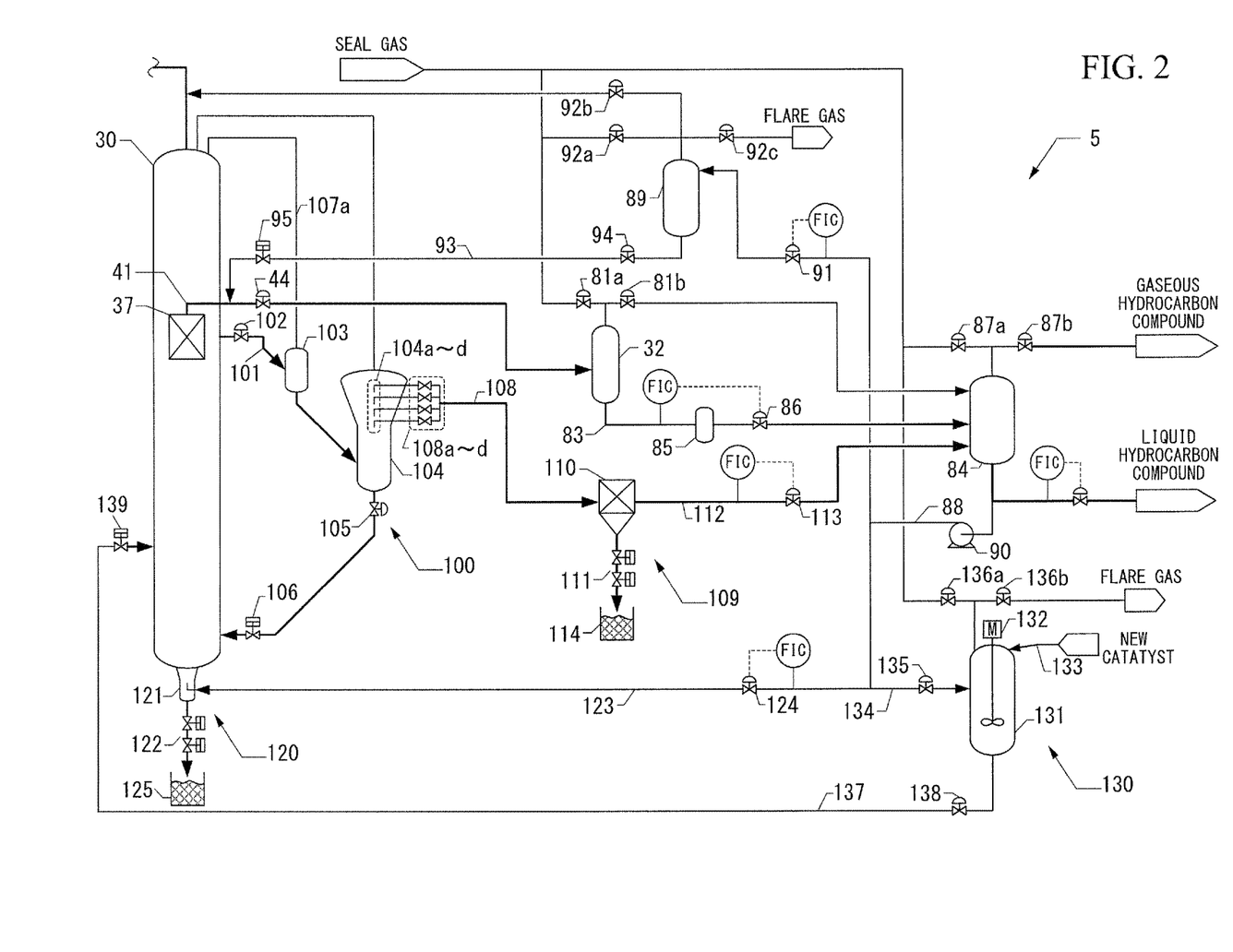
FIG. 2 is a system diagram showing a schematic configuration of main portions of the hydrocarbon synthesis reaction apparatus shown in FIG. 1.

FIG. 2 is a system diagram showing a schematic configuration of main portions of the FT synthesis unit (hydrocarbon synthesis reaction apparatus) 5 shown in FIG. 1.

The primary filter 37 provided within the bubble column reactor 30 is connected with the vapor-liquid separator 32 via a connecting line 41 passing through a side wall of the bubble column reactor 30 and extending to the outside from the primary filter 37. A valve 44 for filtrating is interposed in the connecting line 41. Additionally, only one primary filter 37 is shown in FIG. 2, but in this embodiment, primary filters 37 are arrayed in a plurality of groups, and the valves 44 for filtrating and valves 95 for backwashing to be described below are connected to every group.

A pressure-adjusting valve 81a on a pressurizing side and a pressure-adjusting valve 81b on a depressurizing side is connected to a line extending from the top of the vapor-liquid separator 32, and the pressure-adjusting valves 81a and 81b are opened and closed, whereby the internal pressure of the vapor-liquid separator 32 is adjusted so as to have a predetermined differential pressure with respect to the pressure within the bubble column reactor 30. As a result, the liquid level of the slurry within the bubble column reactor 30 is maintained at a constant height during operation.

A connecting line 83 extends from the bottom of the vapor-liquid separator 32, and a tip of the connecting line 83 is connected to a vapor-liquid separator 84. A secondary filter 85 and a flow-adjusting valve 86 are interposed in the connecting line 83. Additionally, the flow rate of the liquid hydrocarbon compound that flows through the connecting line 83 is adjusted by the flow-adjusting valve 86 so that the liquid level within the vapor-liquid separator 32 is kept constant.

A pressure-adjusting valve 87a on a pressurizing side and a pressure-adjusting valve 87b on a depressurizing side are connected to a line extending from the top of the vapor-liquid separator 84, and the internal pressure of the vapor-liquid separator 84 is adjusted by opening and closing of the pressure-adjusting valves 87a and 87b.

A connecting line 88 extends from the bottom of the vapor-liquid separator 84, and a tip of the connecting line 88 is connected to a backwashing oil drum 89. A backwashing oil transfer pump 90 and a flow-adjusting valve 91 are interposed in the connecting line 88. The liquid hydrocarbon compound is transferred from the vapor-liquid separator 84 to the backwashing oil drum 89 by the backwashing oil transfer pump 90. Additionally, the flow rate of the liquid hydrocarbon compound that flows through the connecting line 88 is adjusted by the flow-adjusting valve 91, and thereby, the liquid level within the backwashing oil drum 89 is kept constant.

A pressure-adjusting valve 92a on a pressurizing side and a pressure-adjusting valve 92b or 92c on a depressurizing side are connected to a line extending from the top of the backwashing oil drum 89, and the internal pressure of the backwashing oil drum 89 is adjusted by opening and closing of the pressure-adjusting valves 92a, 92b, and 92c.

A connecting line 93 extends from the bottom of the backwashing oil drum 89, and a tip of the connecting line 93 is connected to the portion of the aforementioned connecting line 41 between the primary filter 37 and the valve 44 for filtrating. A flow-adjusting valve 94 and a valve 95 for backwashing are interposed in the connecting line 93, respectively. The flow rate of the liquid hydrocarbon compound that flows through the connecting line 93 is adjusted by the flow-adjusting valve 94. As the valve 95 for backwashing is opened and closed, the flow of the liquid hydrocarbon compound from the backwashing oil drum 89 to the connecting line 41 is permitted or cut off.

The bubble column reactor 30 is provided with a powdered catalyst particles-discharging device 100 that discharges powdered catalyst particles in the slurry within the bubble column reactor 30 to the outside of the bubble column reactor 30.

The powdered catalyst particles-discharging device 100 includes an external circulation passage 101 that draws the slurry within the bubble column reactor 30 out to the outside of the bubble column reactor 30, a first classifier 104 that is interposed in the external circulation passage 101, and a powdered catalyst particles separator 110 connected to an upper portion of the first classifier 104 via an outflow passage 108.

That is, a base end of the external circulation passage 101 is connected to the middle portion of the bubble column reactor 30, and a tip of the external circulation passage 101 is connected to the bottom of the bubble column reactor 30. Additionally, an adjusting valve 102, a vapor-liquid separator 103, the first classifier 104, a flow-adjusting valve 105, and an opening and closing valve 106 are interposed in order in the external circulation passage 101 from the base end side toward the tip side.

The adjusting valve 102 and the opening and closing valve 106 operate to allow the external circulation passage 101 to communicate with or be cut off from the inside of the bubble column reactor 30. In a normal operation, the adjusting valve 102 and the opening and closing valve 106 are brought into an open state and allows the external circulation passage 101 to communicate with the inside of the bubble column reactor 30. Additionally, the flow-adjusting valve 105 adjusts the flow rate of the slurry that flows through the external circulation passage 101.

The vapor-liquid separator 103 separates the gas component contained in the slurry discharged from the bubble column reactor 30. The top of the vapor-liquid separator 103 communicates with the top of the bubble column reactor 30 via a connecting line 107a.

The first classifier 104 separates the catalyst included in the slurry separated in the vapor-liquid separator 103 into powdered catalyst particles and catalyst particles with a greater particle diameter than the powdered catalyst particles, by utilizing a settling velocity difference. An upper portion of the first classifier 104 has a cone-shaped structure that spreads upward. Additionally, a plurality of slurry extraction nozzles 104a to 104d arranged in a height direction are provided inside the first classifier 104, and are connected to a slurry outflow passage 108 via the extraction passages 108a to 108d. In addition, although four sets of slurry extraction nozzles 104a to 104d and slurry extraction passages 108a to 108d are provided as an example in FIG. 2, it is important to provide more than one of these nozzles and passages, and the number thereof is not limited to four sets.

The upper portion of the first classifier 104 is connected to a powdered catalyst particles trapping part 109 via the slurry outflow passage 108. The powdered catalyst particles trapping part 109 includes the powdered catalyst particles separator 110 that traps the powdered catalyst particles in the slurry, and an extraction passage 111 that is connected to the powdered catalyst particles separator 110 and is provided to recover the slurry including the trapped catalyst particles. A separation system of the powdered catalyst particles separator 110 is not specified. For example, the separation system may include a filtering system, a gravitational settling system, a cyclone system, a centrifugal separation system, a magnetic separation system, or the like. A connecting line 112 extends from the powdered catalyst particles trapping part 109, and a tip of the connecting line 112 is connected to the vapor-liquid separator 84. A flow-adjusting valve (outflow velocity adjuster) 113 is interposed in the connecting line 112, and the outflow velocity of the liquid hydrocarbon compound that flows through the connecting line 112 is adjusted by operating the flow-adjusting valve 113.

The bottom of the bubble column reactor 30 is provided with an agglomerated catalyst particles discharging device 120 that discharges catalyst particles, which are agglomerated in the slurry within the bubble column reactor 30 and are brought into the state of being easy to settle, to the outside of the bubble column reactor 30. The agglomerated catalyst particles discharging device 120 includes a second classifier 121 that separates larger particles according to the difference of settling velocity, and an extraction passage 122 used to recover the slurry including the catalyst particles agglomerated by being separated and condensed. An upper portion of the second classifier 121 has a cone-shaped structure that spreads upward. Additionally, a connecting line 123 branched from the connecting line 88 is connected to the second classifier 121, and the liquid hydrocarbon compound is blown off upward within the second classifier 121. A flow-adjusting valve (supply rate adjustor) 124 is interposed in the connecting line 123, and the flow rate of the liquid hydrocarbon compound supplied to the second classifier 121 is adjusted by the flow-adjusting valve 124.

A slurry including new catalyst particles is supplied to the bubble column reactor 30 by a catalyst particles feed device 130. The catalyst particles feed device 130 includes a slurry preparation tank 131 for the slurry including new catalyst particles, and a supply passage 137 that connects the slurry preparation tank 131 and the bubble column reactor 30. A connecting line 134, which branches from the connecting line 88 and in which an adjusting valve 135 is interposed, and an input passage 133 used to supply the new catalyst particles are connected to the slurry preparation tank 131, and the slurry preparation tank 131 further includes an agitator 132.

A pressure-adjusting valve 136a on a pressurizing side and a pressure-adjusting valve 136b on a depressurizing side are connected to a line extending from the top of the slurry preparation tank 131. As the pressure-adjusting valves 136a and 136b is opened or closed, the internal pressure of the slurry preparation tank 131 is adjusted so as to have a predetermined differential pressure with respect to the pressure within the bubble column reactor 30, and the slurry of the slurry preparation tank 131 is supplied to the bubble column reactor 30 through the supply passage 137 in which an adjusting valve 138 and an opening and closing valve 139 are interposed.

Next, the operation of the FT synthesis unit 5 having the aforementioned configuration will be described.

The liquid hydrocarbon compound generated by the FT synthesis reaction within the bubble column reactor 30 has most of the catalyst removed therefrom when passing through the primary filter 37, and is led to the vapor-liquid separator 32 through the connecting line 41. The liquid hydrocarbon compound discharged after the gas component is removed in the vapor-liquid separator 32 further passes through the secondary filter 85, and is then sent to the vapor-liquid separator 84. The secondary filter 85 is provided to prevent outflow of the catalyst to subsequent stages caused by damage or the like of the primary filter 37.

A portion of the liquid hydrocarbon compound sent to the vapor-liquid separator 84 is sent to the backwashing oil drum 89 by the backwashing oil transfer pump 90. The liquid hydrocarbon compound sent to the backwashing oil drum 89 is sent to the primary filter 37 via the connecting line 93 and a portion of the connecting line 41, in a state where the valve 95 for backwashing is opened and the valve 44 for filtrating is closed. This allows backwashing of the primary filter 37 to be performed.

In addition, in the normal operation, the valve 95 for backwashing is closed and the valve 44 for filtrating is opened, and thereby filtering of the slurry by the primary filter 37 is performed.

On the other hand, the slurry passed through the primary filter 37 is taken out to the outside of the bubble column reactor 30 via the external circulation passage 101, and only powdered fine catalyst particles among the catalyst particles included in the slurry are removed by the powdered catalyst particles-discharging device 100. After this processing is performed, the slurry is again returned to the inside of the bubble column reactor 30 via the external circulation passage 101.

That is, since the adjusting valve 102 and the opening and closing valve 106 are normally opened, a portion of the slurry within the bubble column reactor 30 is led to the vapor-liquid separator 103 via the external circulation passage 101. Here, after the gas component in the slurry is removed, this slurry is further led to the first classifier 104. In the first classifier 104, the catalyst included in the slurry is separated into the powdered catalyst particles and the catalyst particles with a greater particle diameter than the powdered catalyst particles by the settling velocity difference.

The fine catalyst particles separated from the slurry are led from the outflow passage 108 to the powdered catalyst particles separator 110 of the powdered catalyst particles trapping part 109 together with the liquid hydrocarbon compound, and are trapped by the powdered catalyst particles separator 110. The liquid hydrocarbon compound from which the fine catalyst particles are removed by the powdered catalyst particles separator 110 is led to the vapor-liquid separator 84 via the connecting line 112, and the trapped fine catalyst particles are discharged as a powdered catalyst particles concentrated slurry 114 via the extraction passage 111.

On the other hand, the particle catalyst separated in the first classifier 104 is returned to the bottom of the bubble column reactor 30 via the external circulation passage 101 together with the liquid hydrocarbon compound.

As described above, the FT synthesis unit 5 includes the powdered catalyst particles-discharging device 100, and the powdered catalyst particles in the slurry are continuously discharged to the outside of the bubble column reactor 30 by the powdered catalyst particles-discharging device 100. For this reason, even in a case where the powdering of the catalyst proceeds more than expected or a prolonged operation is performed, the amount of fine catalyst that is present within the bubble column reactor 30 can be prevented from increasing markedly. As a result, the primary filter 37 can be prevented from being clogged due to the large number of powdered catalyst particles. For this reason, the synthesized liquid hydrocarbon compound can be separated from the catalyst by the primary filter 37, and can be stably delivered to the outside of the bubble column reactor 30.

Additionally, in the aforementioned FT synthesis unit 5, the powdered catalyst particles are positively discharged to the outside of the bubble column reactor 30 as mentioned above. Therefore, the number of fine catalyst particles, which are entrained in the gaseous by-product including the unreacted gas and the gaseous hydrocarbon compound that are discharged from the top of the bubble column reactor 30, can also be decreased. For this reason, the number of fine catalyst particles included in the light oil (gas oil) is also decreased, mixing of an element, which causes catalyst poisoning in a process that hydrocracks the light oil in a subsequent stage of a light oil processing system, decreases, and the yield rate of a product improves as a result.

Additionally, the flow-adjusting valve 113 is provided in the connecting line 112, and the outflow velocity of the liquid hydrocarbon compound that flows through the connecting line 112, and eventually, the particle diameter of the catalyst particles separated by the first classifier 104 can be changed depending on the operation of the flow-adjusting valve 113, and which one among the slurry extraction nozzles 104a to 104d and the slurry extraction passages 108a to 108d is selected. That is, if the height where the slurry is extracted is set to a low position and the outflow velocity of the slurry from the first classifier 104 is accelerated, catalyst particles with a relatively large diameter flow into the outflow passage 108, and if the height where the slurry is extracted is set to a high position and the outflow velocity of the slurry from the first classifier 104 is slowed down, catalyst particles with a relatively small diameter flow into the outflow passage 108.

The catalyst particles that are agglomerated and increased in weight within the bubble column reactor 30 are discharged to the outside of the bubble column reactor 30 by the agglomerated catalyst particles discharging device 120. That is, the agglomerated catalyst particles are separated using the settling velocity difference in the second classifier 121 located at the bottom of the bubble column reactor 30, and then are discharged as the agglomerated catalyst particles condensed slurry 125 via the agglomerated catalyst particles extraction passage 122. Here, the second classifier 121 is filled with the catalyst slurry, similar to the inside of the bubble column reactor 30. However, the particle diameter and weight of deactivated catalyst particles to be separated and recovered can be adjusted by a method of supplying the liquid hydrocarbon compound so as to be blown out upward within the second classifier 121 via an upper portion of the second classifier 121 having a cone shape that spreads upward, and the connecting line 123. That is, since the easiness of floating of the particles within the second classifier 121 can be changed by adjusting the flow rate of the liquid hydrocarbon compound supplied to the second classifier 121 by the operation of the flow-adjusting valve 124 of interposed in the connecting line 123, the agglomerated catalyst particles that settle easily are condensed at the bottom of the second classifier 121, and are separated and discharged from catalyst particles smaller than the agglomerated catalyst particles.

As described above, the FT synthesis unit 5 includes the agglomerated catalyst particles discharging device 120, and the agglomerated deactivated catalyst in the bubble column reactor 30 is discharged to the outside of the bubble column reactor 30 by the agglomerated catalyst particles discharging device 120.

The slurry including new catalyst particles is supplied to the bubble column reactor 30 by the catalyst particles feed device 130. The new catalyst particles are supplied to the slurry preparation tank 131 via the input passage 133, the liquid hydrocarbon compound are supplied to the slurry preparation tank 131 via the connecting line 88, and the new catalyst particles and the liquid hydrocarbon compound are agitated by the agitator 132, thereby preparing a slurry having a predetermined concentration. The slurry preparation tank 131 in which the slurry having a predetermined concentration is prepared, is kept at a pressure higher than the bubble column reactor 30 by the operation of the pressure-adjusting valves 136a and 136b, and the slurry within the slurry preparation tank 131 is pumped to the bubble column reactor 30 through the supply passage 137 by opening the adjusting valve 138 and the opening and closing valve 139. Since abrupt supply of the slurry may affect the operation of the bubble column reactor 30, an of supply of the slurry can be adjusted by the adjustment of opening degree of the adjusting valve 138.

As described above, the FT synthesis unit 5 includes the catalyst particles feed device 130, and the slurry including new catalyst particles is supplied to the bubble column reactor 30 by this catalyst particles feed device 130. By measuring the productivity slowdown of the liquid hydrocarbon compound caused by a decrease in the amount of catalyst within the bubble column reactor 30 or degradation of catalytic activity, and adding the bubble column reactor 30 with new catalyst particles corresponding to the measured productivity slowdown, degradation of predetermined performance (production amount of the liquid hydrocarbon compound) as a hydrocarbon synthesis reaction apparatus can be suppressed.

Although the embodiment of the invention has been described above in detail with reference to the drawings, the specific configuration is not limited to the embodiment, and design changes or the like are also included without departing from the scope of the invention.

INDUSTRIAL APPLICABILITY

The present invention relates to a hydrocarbon synthesis reaction apparatus including a reaction vessel that brings a synthesis gas having carbon monoxide gas and hydrogen gas as main components into contact with a slurry having a solid catalyst suspended in a liquid hydrocarbon compound to synthesize a liquid hydrocarbon compound using a Fischer-Tropsch reaction, a filter that is provided within the reaction vessel and is configured to separate the liquid hydrocarbon compound from the catalyst, and a powdered catalyst particles-discharging device configured to discharge powdered catalyst particles in the solid catalyst in the slurry to the outside of the reaction vessel.

According to the invention, the liquid hydrocarbon compound produced inside the reaction vessel can be stably delivered to the outside of the reaction vessel.

DESCRIPTION OF THE REFERENCE SIGNS

3: SYNTHESIS GAS PRODUCTION UNIT
5: FT SYNTHESIS UNIT (HYDROCARBON SYNTHESIS REACTION APPARATUS)
7: UPGRADING UNIT
30: BUBBLE COLUMN REACTOR (REACTION VESSEL)
32: VAPOR-LIQUID SEPARATOR
37: PRIMARY FILTER (FILTER)
44: VALVE FOR FILTRATING
84: VAPOR-LIQUID SEPARATOR
85: SECONDARY FILTER
89: BACKWASHING OIL DRUM
90: BACKWASHING OIL TRANSFER PUMP
95: VALVE FOR BACKWASHING
100: POWDERED CATALYST PARTICLES DISCHARGING DEVICE
101: EXTERNAL CIRCULATION PASSAGE
103: VAPOR-LIQUID SEPARATOR
104: FIRST CLASSIFIER
104a TO 104d: SLURRY EXTRACTION NOZZLES
105: FLOW-ADJUSTING VALVE
108: OUTFLOW PASSAGE
109: POWDERED CATALYST PARTICLES TRAPPING PART
110: POWDERED CATALYST PARTICLES SEPARATOR
111: EXTRACTION PASSAGE
112: CONNECTING LINE
113: FLOW-ADJUSTING VALVE (OUTFLOW VELOCITY ADJUSTER)
114: POWDERED CATALYST PARTICLES CONCENTRATED SLURRY
120: AGGLOMERATED CATALYST PARTICLES DISCHARGING DEVICE
121: SECOND CLASSIFIER
122: AGGLOMERATED CATALYST PARTICLES EXTRACTION PASSAGE (DISCHARGING PASSAGE)
123: CONNECTING LINE
124: FLOW-ADJUSTING VALVE (SUPPLY RATE ADJUSTOR)
125: AGGLOMERATED CATALYST PARTICLES CONDENCED SLURRY
130: CATALYST PARTICLES FEED DEVICE
131: SLURRY PREPARATION TANK
132: AGITATOR
133: INPUT PASSAGE
137: SUPPLY PASSAGE
138: ADJUSTING VALVE

The invention claimed is:

1. A hydrocarbon synthesis reaction apparatus, comprising:
a reaction vessel configured to bring a synthesis gas having carbon monoxide gas and hydrogen gas as main components into contact with a slurry having a solid catalyst suspended in a liquid hydrocarbon compound to synthesize a liquid hydrocarbon compound using a Fischer-Tropsch reaction;
a filter that is installed inside the reaction vessel and is configured to separate the liquid hydrocarbon compound from the catalyst; and
a powdered catalyst particles-discharging device configured to discharge powdered catalyst particles in the solid catalyst in the slurry to the outside of the reaction vessel, wherein
the powdered catalyst particles-discharging device includes:
a first classifier configured to separate the powdered catalyst particles from the solid catalyst in the slurry, using a settling velocity difference of the particles in a liquid;
an outflow passage configured that the powdered catalyst particles separated in the first classifier flows to the outside of the first classifier together with the liquid hydrocarbon compound therethrough; and
a powdered catalyst particles separator that is provided in the outflow passage and is configured to trap the powdered catalyst particles.

2. The hydrocarbon synthesis reaction apparatus according to claim 1, further comprising:
an outflow velocity adjuster configured to adjust the outflow velocity of the liquid hydrocarbon compound, including the powdered catalyst particles, in the outflow passage, wherein an upper portion of the first classifier is formed in the shape of a cone, and
wherein a plurality of slurry extraction nozzles arrayed in a height direction of the first classifier are provided inside the first classifier.

3. The hydrocarbon synthesis reaction apparatus according to claim 1, wherein any one of a filtering system, a gravitational settling system, a cyclone system, a centrifugal separation system, and a magnetic separation system is adopted in the powdered catalyst particles separator.

4. The hydrocarbon synthesis reaction apparatus according to claim 1, further comprising:
an agglomerated catalyst particles discharging device configured to discharge agglomerated catalyst particles in the solid catalysts in the slurry to the outside of the reaction vessel.

5. The hydrocarbon synthesis reaction apparatus according to claim 4, wherein the agglomerated catalyst particles discharging device includes:
a second classifier configured to separate the agglomerated catalyst particles from the solid catalyst in the slurry, using a settling velocity difference of the particles in
a liquid; and
a discharging passage configured that the agglomerated catalyst particles separated in the second classifier are discharged to the outside of the second classifier therethrough.

6. The hydrocarbon synthesis reaction apparatus according to claim 5, further comprising:

a supply rate adjustor configured to adjust the supply rate of the liquid hydrocarbon compound in a communication line that supplies the liquid hydrocarbon compound to the second classifier, wherein an upper portion of the second classifier is formed in the shape of a cone, and wherein the liquid hydrocarbon compound supplied to the second classifier is blown out upward inside the second classifier.

7. The hydrocarbon synthesis reaction apparatus according to claim 1, wherein the reaction vessel is further provided with a catalyst particles feed device configured to feed new catalyst particles to the slurry in the reaction vessel.

* * * * *